United States Patent
Malatak et al.

(10) Patent No.: US 6,964,696 B2
(45) Date of Patent: Nov. 15, 2005

(54) METHOD AND APPARATUS FOR TREATING SYNTHESIS GAS AND RECOVERING A CLEAN LIQUID CONDENSATE

(75) Inventors: William A. Malatak, The Woodlands, TX (US); Brad X. Pan, Houston, TX (US)

(73) Assignee: Texaco, Inc., San Ramon, CA (US)

(*) Notice: Subject to any disclaimer, the term of this patent is extended or adjusted under 35 U.S.C. 154(b) by 0 days.

(21) Appl. No.: 10/309,481

(22) Filed: Dec. 4, 2002

(65) Prior Publication Data

US 2004/0107835 A1 Jun. 10, 2004

(51) Int. Cl.[7] ............................................. B01D 19/00
(52) U.S. Cl. ........................... 95/163; 48/61; 48/127.9; 48/198.3; 95/172; 95/177; 95/266; 96/193; 96/234; 422/234
(58) Field of Search ..................... 48/61, 62 R, 127.9, 48/197 R, 198.3, 214 R, 215, 206; 422/234, 235; 122/15, 449; 95/174, 163, 172, 177, 149, 266, 196, 205; 96/143, 243, 234

(56) References Cited

U.S. PATENT DOCUMENTS

| | | | |
|---|---|---|---|
| 2,809,104 A | | 10/1957 | Strasser et al. |
| 2,928,460 A | | 3/1960 | Eastman et al. |
| 3,017,259 A | * | 1/1962 | Eastman ..................... 48/216 |
| 3,945,942 A | | 3/1976 | Marion et al. |
| 4,031,030 A | * | 6/1977 | Rudolph ..................... 252/373 |
| 4,065,273 A | * | 12/1977 | Rudolph ..................... 95/208 |
| 4,074,981 A | * | 2/1978 | Slater ....................... 48/197 R |
| 4,141,696 A | | 2/1979 | Marion et al. |
| 4,159,238 A | | 6/1979 | Schmid |
| 4,235,625 A | * | 11/1980 | Tippmer ..................... 48/202 |
| 4,547,293 A | * | 10/1985 | King et al. .................. 210/638 |
| 4,588,418 A | * | 5/1986 | Gabler et al. ............. 48/197 R |
| 4,704,137 A | * | 11/1987 | Richter ..................... 48/197 R |
| 4,752,308 A | * | 6/1988 | Brandl et al. ................ 95/195 |
| 4,851,013 A | | 7/1989 | Luke |
| 4,854,942 A | * | 8/1989 | Denney et al. ............ 48/197 R |
| 5,041,144 A | * | 8/1991 | Lath ........................ 48/197 R |
| 5,415,673 A | | 5/1995 | Hilton et al. |
| 5,435,940 A | | 7/1995 | Doering et al. |
| 5,656,044 A | | 8/1997 | Bishop et al. |
| 6,610,112 B1 | * | 8/2003 | Klock et al. ............... 48/214 R |

FOREIGN PATENT DOCUMENTS

EP 1108686 6/2001

* cited by examiner

Primary Examiner—Duane S. Smith
(74) Attorney, Agent, or Firm—Cantor Colburn LLP

(57) ABSTRACT

An apparatus and method for recovering a clean liquid condensate from a synthesis gas at elevated temperatures and pressures. The apparatus includes at least one heat exchanger for reducing the temperature of the synthesis gas down to below 200° F. (93° C.) so as to form a syngas condensate at elevated pressure. The syngas condensate is flashed so that it separates into a liquid phase condensate and a gas phase. The liquid phase condensate comprises water, dissolved ammonia and particulates. The gas phase contains carbon monoxide, carbon dioxide, various sulfur containing compounds and trace amounts of other compounds that may have been dissolved in the syngas condensate. The gas phase is removed from the flash tank and sent to a sour gas treatment unit and/or flare. The liquid phase condensate is then filtered so as to remove larger sized particulates. Clean liquid condensate is reused in the gasification process.

26 Claims, 1 Drawing Sheet

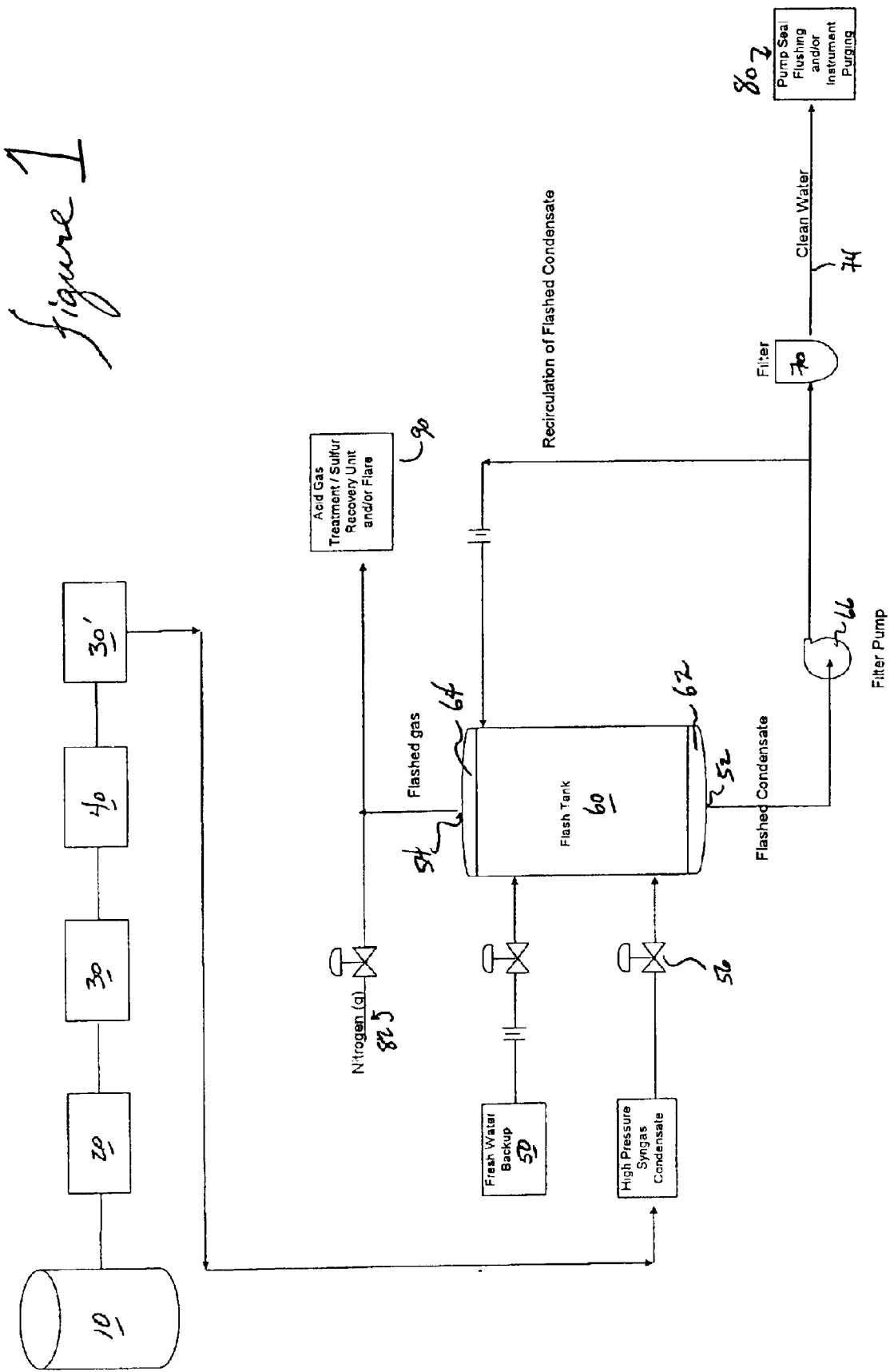

METHOD AND APPARATUS FOR TREATING SYNTHESIS GAS AND RECOVERING A CLEAN LIQUID CONDENSATE

FIELD OF THE INVENTION

The field of the present invention is related to the treatment of synthesis gas to recover water from the synthesis gas in a form that may be used in a gasification unit in place of fresh water.

BACKGROUND OF THE INVENTION

Synthesis gas, or syngas, may be produced by reacting solid or liquid or gaseous carbonaceous fuels with gases such as air, enriched air, or oxygen, in the optional presence of steam or water in a gasification reactor. The syngas obtained is withdrawn from the gasification reactor and subjected to several cleansing operations to rid it of various contaminants which are formed or liberated from the carbonaceous fuels during the gasification operation. For example, materials often found in the syngas include hydrogen sulfide, ammonia, cyanides, various halogens and particulates in the form of carbon, ash, and coal, as well as trace metals.

Particulate solids, i.e. carbon, soot, and ash, entrained in the hot raw gas stream from a partial oxidation gas generator can be removed by quench cooling the hot gas stream directly in water in a quench drum and by scrubbing with water in a gas scrubbing zone. By this means, a syngas stream and a dispersion of particulate solids i.e. carbon and ash are produced. It is economic to reclaim the water in the aforesaid dispersion by removing particulate solids and gaseous impurities and recycling the reclaimed water for use in the gas quench cooling and scrubbing operations. However, the levels of impurities and particulates in such reclaimed water are still too high to enable its general use in gasification subsystems that would otherwise require a supply of fresh water, such as in pump flushing systems and various instrumentation systems including level and flow detection systems.

Therefore, although the prior art has utilized various methods and devices for reclaiming water from a gasification system, such systems have not been able to remove a sufficient quantity of the gaseous impurities and particulates so as to allow the general use of the reclaimed water in place of fresh water in those gasification subsystems that would otherwise require a source of fresh water.

SUMMARY OF THE PRESENT INVENTION

The present invention provides an apparatus for treating synthesis gas to recover clean liquid condensate for use in a gasification unit. The apparatus comprises a series of heat exchangers for receiving a synthesis gas having elevated temperature and pressure and for cooling the synthesis gas to form a syngas condensate. A flash tank is provided for receiving the syngas condensate, the flash tanks having a reduced pressure so that the syngas condensate separates into a liquid phase condensate and a gas phase. In addition, a separator is provided for receiving the liquid phase condensate and for reducing the number of particulates that may be present in the liquid phase condensate to form a clean liquid condensate. The liquid phase condensate comprises water, dissolved ammonia, particulates or mixtures thereof and the gas phase comprises carbon monoxide, carbon dioxide, ammonia, hydrogen, sulfide compounds or mixtures thereof. Preferably, the separator will remove particulates in the liquid condensate having an average particle diameter of greater than about 15 microns, more preferably greater than about 10 microns, and even more preferably greater than about 5 microns. Optionally, but preferably, the apparatus comprises a source of fresh backup water connected to the flash tank and a gas treatment unit downstream from the flash tank for removing gaseous impurities from the gas phase. Preferably, the apparatus further comprises a conduit connected to the separator for directing the clean liquid condensate back to one or more of the gasification subsystems that requires a source of clean water. Such subsystems include pump flushing systems and purge systems for various sensor and detection systems.

In a process aspect, the present invention further provides a method for treating a synthesis gas to recover a clean liquid condensate for use in a gasification unit. The method comprises the steps of cooling a synthesis gas having elevated temperature and pressure to form a syngas condensate, flashing the syngas condensate to form a gas phase and a liquid phase condensate, and reducing the number of particulates in the liquid phase condensate by removing particulates having an average particle diameter of greater than about 15 microns so as to form a clean liquid condensate. Preferably, the temperature of the syngas condensate is below about 200° F. and the pressure of the liquid phase condensate and gas phase is less than about 10 barg. The liquid phase condensate comprises water, dissolved ammonia, particulates or mixtures thereof and the gas phase condensate comprises carbon monoxide, carbon dioxide, ammonia, hydrogen, sulfide compounds or mixtures thereof. Optionally, but preferably, the method further comprises the step of directing the clean liquid condensate to one or more gasification subsystems that requires a source of clean water. Such subsystems include the pump flushing systems and various sensor and detection systems.

In another process aspect, the present invention provides a method for inhibiting acid-induced corrosion in a gasification unit. The method for inhibiting corrosion comprises the steps of cooling a synthesis gas having elevated temperature and pressure to form a syngas condensate, flashing the syngas condensate to form a gas phase and a liquid phase condensate, removing from the liquid phase condensate particulates having an average particle diameter of greater than about 15 microns to form a clean liquid condensate comprising dissolved ammonia, and recycling the clean liquid condensate to the gasification unit, provided that the clean liquid condensate is not used to cool hot raw synthesis gas. The amount of dissolve ammonia in the clean liquid condensate is sufficient to maintain the pH of the condensate above about 7, thereby by neutralizing the acid components that are generated in synthesis gas and inhibiting corrosion to the gasification system and its components.

BRIEF DESCRIPTION OF THE DRAWING

The FIGURE is a process flow chart of a method and apparatus of the present invention for recovering a clean liquid condensate from a synthesis gas at elevated temperature and pressure.

DESCRIPTION OF THE PREFERRED EMBODIMENTS

In the instant invention, carbonaceous fuel is first obtained and prepared for feeding to a gasification reactor. Carbonaceous fuel is any solid, liquid, or gaseous combustible organic material that can be used as feedstock to a gasification process for synthesis gas production. A feed preparation step may not be necessary given the composition and physical nature of the feedstock. Generally, solid carbonaceous fuels will need to be liquefied with oil or water prior to feeding to the gasifier. Liquid and gaseous carbonaceous fuels may be suitable for direct feed to the gasifier, but can be pre-treated for removal of any impurities that might be present in the feed. For example, pumpable aqueous slurries of solid carbonaceous fuels are suitable feedstocks. In fact, substantially any combustible carbon-containing organic material or slurries thereof may be used. Specific examples include but are not limited to:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuel feedstocks includes various materials, such as liquefied petroleum gas, petroleum distillates and residua, gasoline, naphtha, kerosene, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof;

(3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof; and (4) gaseous hydrocarbonaceous fuels including vaporized liquid natural gas, refinery off-gas, $C_1$–$C_4$ hydrocarbonaceous gases, and waste carbon-containing gases from chemical processes.

After the feed preparation step, if used, the solid and/or liquid carbonaceous fuel is sent to a gasification reactor, or gasifier. In the gasifier, the feed is reacted with a reactive free oxygen-containing gas. The term free-oxygen containing gas as used herein means air, oxygen-enriched air i.e. greater than 21 mole % $O_2$, and substantially pure oxygen, i.e. greater than about 95% mole oxygen (the remainder usually comprising $N_2$ and rare gases). Substantially pure oxygen is preferred, such as that which is produced by an air separation unit (ASU). The partial oxidation of the hydrocarbonaceous material is carried out, typically in the presence of a temperature control moderator such as steam in a gasification zone to obtain hot synthesis gas, or syngas. The need for a temperature moderator to control the temperature in the reaction zone of the gas generator depends in general on the carbon-to-hydrogen ratios of the feedstock and the oxygen content of the oxidant stream. A temperature moderator is commonly used with liquid hydrocarbon fuels with substantially pure oxygen. Water/steam is the preferred temperature moderator. Steam may be introduced as a temperature moderator with a reactant stream. Alternatively, the temperature moderator may be introduced into the reaction zone of the gasifier by way of a separate conduit in the burner. Other temperature moderators include $CO_2$-rich gases, nitrogen, recycled synthesis gas, recycled components of synthesis gas and mixtures thereof.

A gasification reactor generally comprises a reaction zone, made up of a vertical cylindrically shaped steel pressure vessel lined with refractory, and a quench drum, such as shown in U.S. Pat. No. 2,809,104, the disclosure of which is incorporated herein by reference. A burner, such as shown in U.S. Pat. No. 2,928,460, which is incorporated herein by reference, may be used to introduce the feed streams into the reaction zone. In the reaction zone of a gasifier, the contents will commonly reach temperatures in the range of about 1,700° F. (927° C.) to 3,000° F. (1649° C.), more typically in the range of about 2,000° F. (1093° C.) to 2,800° F. (1538° C.). Pressure will typically be in the range of about 1 psi (101 kPa) to about 3675 psi (25,331 kPa), and more typically in the range of about 200 psi (1378 kPa) to about 2000 psi (13,782 kPa), and even more typically in the range of about 400 psi (2757 kPa) to about 1200 psi (8269 kPa). See U.S. Pat. No. 3,945,942 for a detailed description of a partial oxidation burner assembly. See U.S. Pat. No. 5,656,044 describing a method and an apparatus for the gasification of organic materials. See also U.S. Pat. Nos. 5,435,940, 4,851,013, and 4,159,238 describing a few of the many gasification processes that are known in the prior art. The entire disclosures of these above referenced patents are hereby incorporated by reference and relied upon.

The hot gasification process product synthesis gas, or syngas, comprises carbon monoxide, carbon dioxide, and hydrogen. Other materials that are often found in the synthesis gas include hydrogen sulfide, ammonia, cyanides, and particulates in the form of carbon and trace metals. The extent of the contaminants in the feed is determined by the type of feed and the particular gasification process utilized as well as the operating conditions. The removal of these contaminants is preferable to make gasification a viable process.

As the synthesis gas is discharged from the gasifier, it passes into a gasification quench chamber for cooling and cleaning. A procedure in which the partial oxidation gas is brought in contact with water to remove contaminants is generally referred to as "scrubbing." The turbulent condition in the quench chamber, caused by large volumes of gases bubbling up through the water, helps the water to scrub much of the solids from the effluent gas. Large quantities of steam are generated within the quench chamber that saturate the syngas stream. The stream of raw gas is cooled in the quench drum and leaves at a temperature in the range of about 300° F. to 600° F. (about 149° C. to 315° C.), typically between about 450° F. to 550° F. (about 230° C. to 290° C.), and at a pressure above about 25 barg, and typically above about 50 barg.

Although the syngas is described herein as being cooled via a direct quench in a quench chamber, many means are known in the art for cooling hot syngas. The method by which hot syngas is cooled as it exits the gasifier is not critical to the present invention except to the extent that the selected cooling method, either alone or in combination with separate scrubbing, should cool the syngas and provide scrubbing to remove a substantial portion of tar and ash from the syngas stream.

After scrubbing, an appreciable amount of the particulate contaminants remain in the water. These particulates initially form a dispersion in the water and over time and as the water cools settle to the bottom of the scrubbing tower where they can be removed through a blowdown or other outlet port. The water within the scrubbing tower will often also contain some trace metals and halogens. Likewise, the water will often contain dissolved gaseous contaminants, like ammonia, hydrogen sulfides, carbonyl sulfides, and cyanides that are at least somewhat soluble in the water. However, the levels of these gaseous contaminants in scrubbing water will typically be very small due to the temperature of the water and the process pressures.

After bubbling, the syngas emerges from the scrubbing water. However, substantially all of the ammonia, hydrogen sulfide, carbonyl sulfide, and cyanides initially present in the gas stream entering the scrubber will still be present in the syngas after scrubbing. Additionally, the emerging gas will contain a significant amount of water vapor. Also present in the emerging gas are residual levels of particulate contaminants.

After scrubbing, the syngas stream is gradually cooled while maintaining pressure. During this operation the temperature of the syngas is reduced to a temperature below about 200° F. (93° C.), preferably below about 160° F. (71° C.) and more preferably below about 150° F. (66° C.). The method used to cool the syngas to this temperature range is not critical and an appropriate method can be selected by those skilled in the art. Preferably, a heat exchanger is used to cool the syngas, or more preferably, two or more heat exchangers in series are used to gradually cool the syngas in a stepwise fashion while maintaining pressure. Additionally, one or more knock-out drums may be used in combination with the heat exchanger(s). During this cooling, the syngas is converted to a syngas condensate comprising water, particulates, dissolved gases including hydrogen, ammonia, carbon monoxide, carbon dioxide, hydrogen sulfide and mixtures thereof.

The syngas condensate is then passed through control valving to reduce the pressure on the condensate, and then directed into a flash tank or similar vessel having reduced pressure. The pressure downstream of the control valving and in the flash tank is below about 10 barg (1000 kPa), preferably below about 5 barg (~500 kPa) and still more preferably below about 2 barg (~200 kPa). Under the temperature and reduced pressure conditions in the flash tank, most of the dissolved gases in the syngas condensate evolve out of the condensate into a separate gas phase. As such, the syngas condensate is converted to a liquid phase condensate and a gas phase. However, under the temperature and pressure conditions in the flash tank, a substantial portion, up to about 50% or more, of the ammonia dissolved in the syngas condensate remains in solution and does not evolve into the gas phase. Upon separation, the liquid phase condensate comprises water, dissolved ammonia, particulates or mixtures thereof and the gas phase condensate comprises hydrogen, carbon monoxide, carbon dioxide, sulfur compounds and mixtures thereof.

The process gas evolved from the flashing process, referred to herein as the gas phase, is evacuated from the upper portion of the flash tank and is sent to an gas treatment unit so that the acid gas impurities can be removed. Acid gas removal facilities for synthesis gas usually employ amine or physical solvents to remove acid gases, such as carbon dioxide and hydrogen sulfide from the synthesis gas stream. Additional treatment systems are typically employed.

The liquid phase condensate in the bottom of the flash drum is pumped out and directed to a separator to reduce the number of particulates that are present in the flashed liquid phase condensate. Preferably, the separator has a filtering media for removing from the liquid condensate those particulates having an average particle diameter greater than about 15 microns, preferably greater than about 10 microns, and even more preferably greater than about 5 microns. Preferably, the separator is a filter or membrane-type separator for separating solids from liquids. Suitable filters include those known in the art for separating solids from liquids and may be purchased from U.S. Filters (Warrendale, Pa.). Preferably, selected filters will have a pore size of less than about 20 microns.

Upon removal of the larger-sized particulates from the liquid phase condensate, the clean liquid condensate is sufficiently-free of gaseous impurities and particulates having an average particle diameter of greater than about 15 microns that it may be used in various gasification unit subsystems in place of fresh water. Fresh water streams may be referred to by a number of names including back-up or make-up water, demineralized water, clean condensate, boiler feed water, and in some cases clarified water. Although a number of methods are known in the art for reclaiming water from synthesis gas, such methods do not produce water than can be used in place of fresh water, and as such, the use of such reclaimed water is typically limited to quench cooling and scrubbing synthesis gas.

The clean liquid condensate produced in the apparatus and through the methods of the present invention may be used in gasification subsystems such as pump seal flushing systems where the presence of large-sized particulates can quickly damage the pump seals and internal pump surfaces causing leakage. Similarly, a number of instrumentation systems are used in gasification units to monitor liquid levels and flow rates. Such systems typically require periodic purging in order to ensure their reliable operation and the clean liquid condensate of the present invention is appropriate for use in maintaining these instruments. Examples of such detectors include differential pressure level detectors, sight glasses and magnetic level detectors amongst others.

Because the methods and apparatus of the present invention provide a clean liquid condensate that can be used in place of fresh water, the implementation of these methods reduces the fresh water demands of a given gasification unit. In addition, by reclaiming water from the synthesis gas, costs that would have otherwise been incurred in treating and/or disposing of that water are not incurred.

Still an additional benefit of the present invention is a reduction in the amount of ammonia that must be added to the gasification system in order to maintain the desired pH. As noted above, the gasification of hydrocarbonaceous fuels generates acid gases and other acidic components that are corrosive to the piping, pumps and other instrumentation in the gasification unit. High grade stainless steels resistant to such corrosion are commonly used in the manufacture of gasification units, and typically, ammonia is added to inhibit corrosion that might otherwise occur. Typically, the ammonia is lost during the cooling and clean-up of the synthesis gas. However, as noted above, it has been found that with the method of the present invention that up to about 50% or more of the ammonia remains dissolved in the clean liquid condensate and is recycled, eliminating the need to recover and recycle the ammonia with additional processing and reducing the amount of ammonia that must be added. The result is that the pH of the gasification system tends to be more uniform throughout the system.

Thus, in an alternative embodiment, the present invention provides a method for inhibiting acid-induced corrosion in a gasification unit by recycling the ammonia in the form of dissolved ammonia present in the clean liquid condensate. The method for inhibiting corrosion comprises the steps of cooling a synthesis gas having elevated temperature and pressure to form a syngas condensate, flashing the syngas condensate to form a gas phase and a liquid phase condensate, removing from the liquid phase condensate particulates having an average particle diameter of greater than about 15 microns to form a clean liquid condensate comprising dissolved ammonia, and recycling the clean liquid condensate to the gasification unit. The amount of dissolve ammonia in the clean liquid condensate is sufficient to maintain the pH above about 7, and preferably in the range between about 7 and about 10, to thereby by neutralize the acid components that are generated in synthesis gas and to inhibit corrosion to the gasification system and its components.

DETAILED DESCRIPTION OF THE DRAWING

Referring to the FIGURE, synthesis gas is generated by a partial oxidation reaction occurring in synthesis gas generator or gasifier 10. The syngas is routed to scrubber 20 where it is cooled and scrubbed.

The syngas stream exiting the scrubber is at a temperature of above about 380° F. The overhead stream coming off of scrubber 20 contains hydrogen, carbon monoxide, carbon dioxide, water vapor, ammonia, particulates and various acid gases. This syngas stream is cooled in heat exchanger 30 and knock-out drum 40 while its pressure is maintained. Although not shown, two or more heat exchangers (shown as 30') may be used to gradually reduce the temperature of the syngas in a stepwise fashion. As the syngas is cooled it condenses to form a syngas condensate. The syngas condensate is passed through control valving 56 and into flash tank 60. The pressure on the syngas upstream from control valving 56 is above about 25 barg and more typically is above about 50 barg. Those skilled in the art will recognize that the pressure upstream from control valving 56 is approximately the same pressure as is found in gasifier 10.

A source fresh water 50 is connected to flash tank 60 for providing back-up water in the event the volume of syngas condensate is insufficient to provide needed volumes of clean liquid condensate, such as may occur during the start up operations of the gasifier.

The pressure on the syngas condensate downstream of control valving 56 is below about 10 barg, preferably below about 5 barg and still more preferably is about 2 barg. Within flash tank 60, the reduced pressure on the syngas condensate enables most of the dissolved gases to evolve out of solution to form a gas phase in upper portion 64 of flash tank 60.

The gas phase condensate is evacuated from upper portion 64 through outlet 54. The gas phase is then directed to gas treatment unit 90 for removal of the various gas impurities such as carbon dioxide and hydrogen sulfide. Although not shown, it is typical for gasification operations to include a sulfur recovery unit to recover sulfur and to provide a flare for combusting those gaseous components that may be disposed of safely through open combustion to the atmosphere. A source of nitrogen 82 is also provided for use in evacuating the gas phase condensate from tank 60 and directing the gas phase condensate downstream to the gas treatment unit(s).

A liquid phase condensate forms in lower portion 62 of flash tank 60. The liquid phase condensate comprises water, dissolved ammonia, particulates that have been carried over with the syngas, and mixtures thereof. The liquid phase condensate is withdrawn from flash tank 60 through outlet 52 and is routed to filter 70. Filter pump 66 is used to facilitate the withdrawal of liquid phase condensate from the flash tank, but gravity feed may suffice depending on the arrangement of filter 70. Filter 70 removes from the liquid phase condensate the larger sized particulates, namely those particulates having an average particle diameter of greater than about 15 microns, preferably greater than about 10 microns and more preferably greater than about 5 microns, leaving a clean liquid condensate that comprises water, dissolved ammonia and only small sized particulates.

The clean liquid condensate is safe for use in the gasification unit in place of fresh, demineralized water. As specifically illustrated in the FIGURE, the clean liquid condensate is routed via line 74 to pumps 80 in the gasification unit for use in flushing the seals of the pumps and/or to various instrumentation systems in the unit, such as sensors and level detectors, for use in purging those instruments.

What is claimed is:

1. An apparatus for treating synthesis gas to recover clean liquid condensate for use in a gasification unit, the apparatus comprising:

a heat exchanger for receiving a synthesis gas having elevated temperature and pressure and cooling the synthesis gas to form a syngas condensate;

a flash tank for receiving the syngas condensate, the flash tank having a reduced pressure so that the syngas condensate separates into a liquid phase condensate and a gas phase, the liquid phase condensate comprising dissolved ammonia; and a separator for receiving the liquid phase condensate, the separator having a filtering media for reducing the number of particulates that may be present in the liquid phase condensate to form a clean liquid condensate, wherein the separator reduces the number of particulates by removing particulates having an average particle diameter greater than about 15 microns.

2. The apparatus of claim 1, further comprising a source of fresh backup water connected to the flash tank.

3. The apparatus of claim 1, wherein the reduced pressure in the flash tank is less than about 10 barg.

4. The apparatus of claim 1, further comprising a gas treatment unit in fluid communication with the upper portion of the flash tank.

5. The apparatus of claim 1, wherein the separator removes particulates having an average particle diameter of greater than about 5 microns.

6. The apparatus of claim 5, wherein the separator is a filter having an average pore size of less than about 20 microns.

7. The apparatus of claim 1, further comprising a conduit connected to the separator for directing the clean liquid condensate to a gasification unit, provided that the conduit does not direct the clean liquid phase condensate to a gasification unit for use in cooling or scrubbing the hot raw synthesis gas.

8. The apparatus of claim 1, further comprising a pump connected to the separator, the pump having a seal that requires periodic flushing with fresh water to prevent damage to the pump.

9. The apparatus of claim 1, further comprising an instrument connected to the separator, the instrument requiring periodic purging to insure reliable operation.

10. The apparatus of claim 9, wherein the instrument comprises a liquids level detector and/or liquids flow detector.

11. The apparatus of claim 1, wherein the gas phase condensate comprises hydrogen, carbon monoxide, carbon dioxide, sulfur compounds or mixtures thereof.

12. The apparatus of claim 1, wherein the temperature of the syngas condensate is below about 200° F.

13. A method for treating a synthesis gas to recover a clean liquid condensate for use in a gasification unit, the method comprising the steps of:

cooling a synthesis gas having elevated temperature and pressure to form a syngas condensate;

flashing the syngas condensate to form a gas phase condensate and a liquid phase condensate, the liquid phase condensate comprising dissolved ammonia; and removing from the liquid phase condensate particulates having an average particle diameter of greater than about 15 microns to form a clean liquid condensate.

14. The method of claim 13, wherein the temperature of the synthesis gas is above about 380° F.

15. The method of claim 13, wherein the temperature of the syngas condensate is below about 200° F.

16. The method of claim 13, wherein the pressure of the synthesis gas is above about 25 barg.

17. The method of claim 13, wherein the pressure of the liquid phase condensate and gas phase condensate in the flash tank is less than about 10 barg.

18. The method of claim 13, wherein the gas phase condensate comprises hydrogen, carbon monoxide, carbon dioxide, sulfur compounds or mixtures thereof.

19. The method of claim 13, further comprising the step of flushing a pump seal with the clean liquid condensate.

20. The method of claim 13, further comprising the step of purging an instrument with the clean liquid condensate.

21. The method of claim 20, wherein the instrument comprises a liquids level detector, liquids flow detector, or a combination thereof.

22. A method for inhibiting acid-induced corrosion in a gasification unit, the method comprising the steps of:

cooling a synthesis gas having elevated temperature and pressure to form a syngas condensate;

flashing the syngas condensate to form a gas phase condensate and a liquid phase condensate, the liquid phase condensate comprising dissolved ammonia;

removing from the liquid phase condensate particulates having an average particle diameter of greater than about 15 microns to form a clean liquid condensate; and recycling the clean liquid condensate to the gasification unit, provided that the clean liquid condensate is not used to cool or scrub the hot raw synthesis gas.

23. The method of claim 22, wherein the recycled clean liquid condensate is used to flush a pump seal.

24. The method of claim 22, wherein the recycled clean liquid condensate is used to purge an instrument.

25. The method of claim 24, wherein the instrument comprises a liquids level detector, liquids flow detector, or a combination thereof.

26. The method of claim 22, wherein the amount of ammonia dissolved in the liquid condensate is sufficient to maintain the pH of the condensate above about 7.

* * * * *